Aug. 2, 1938.                B. MARTINS                2,125,511
                           WHEEL SUSPENSION
                        Filed Dec. 16, 1935          5 Sheets-Sheet 1

INVENTOR
*Borge Martins.*
BY
*Harness, Dickey, Pierce & Hann*
ATTORNEYS.

Patented Aug. 2, 1938

2,125,511

UNITED STATES PATENT OFFICE 2,125,511

WHEEL SUSPENSION

Borge Martins, Copenhagen, Denmark

Application December 16, 1935, Serial No. 54,636

23 Claims. (Cl. 267—20)

This invention relates to a resilient connection between a pair of relatively movable parts or members and, although in the broader aspects of the invention it is applicable to a great variety of uses, it is particularly applicable for use in connection with wheel suspensions for motor vehicles and the like. Accordingly, although the following specification deals almost exclusively with the application of the invention to wheel suspensions for motor vehicles, its application to other uses will be readily understood by those skilled in the art.

Objects of the invention include the provision of a structure for resiliently connecting a pair of relatively movable parts in such a manner as to permit a maximum amount of movement of the parts with a minimum amount of movement of the resisting spring means; the provision of a structure for yieldably connecting a pair of movable parts so constructed and arranged as to be capable of handling a wide variety of loads thereon and still function properly regardless of the amount of such load; the provision of a structure as above described which may be used either by itself or in conjunction with other yieldable or resilient elements in yieldably connecting a pair of relatively movable parts together; and the provision of a construction as above described that is simple in construction, efficient in operation and economical to produce.

Other objects of the invention are to provide a vehicle wheel suspension or like device including a pair of relatively movable parts rockably associated with each other and each pivotally mounted independently of the other, rocking movement between the parts being resisted by suitable spring means constantly urging the parts towards one limit of their rockable and pivotable positions; the provision of a construction as above described particularly adapted for the independent wheel suspension of vehicles; the provision of a construction as above described permitting the independent suspension of the steering wheels of a motor vehicle; and the provision of an independent wheel suspension for motor vehicles by the use of which the wheels in moving relative to the frame are constrained in their movements to a single vertical plane thereby eliminating the rubbing action of the wheel tires on the road surface during such movement as occurs in conventional independent wheel suspension systems.

Other objects of the invention are to provide a novel form of inter-engaging surfaces on the rockable members.

Further objects of the invention are to provide a novel means for mounting and controlling the steering wheels of a motor vehicle.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views.

Fig. 30A is a more or less diagrammatic side elevational view of a car buffer incorporating features of the present invention.

As previously mentioned the present invention relates to yieldable connections between two relatively movable members and while its range of application is relatively wide in that it may be employed in almost any connection wherein it is desired to resiliently resist relative movement between two relatively movable parts or members, it is particularly applicable for use in connection with the wheel suspensions of motor vehicles. In this connection it forms an improvement over the construction shown and described in my copending application for Letters Patent of the United States filed May 31, 1935 for Improvements in wheel suspensions for vehicles or the like and serially numbered 24,323. While the construction shown in my previous application above referred to is satisfactory in operation and includes many desirable features it has certain limitations which the present invention overcomes. For instance, my prior construction necessitated the use of a relatively long coiled spring to obtain the desired degree of relative movement between the connected parts, and where a sufficiently long spring was employed its bulk provided a problem of accommodation particularly in connection with the application of the structure to motor vehicles. Also, in my prior construction if a spring of sufficient length was not employed the resistance to relative movement between the parts increased out of proportion to the increase in load tending to move the parts relative to each other which also created an undesirable condition. Furthermore, my prior construction proved more difficult in its application to the suspension of the steering road wheels of a motor vehicle than the present invention and is, therefore, undesirable in that respect.

In accordance with the present invention the two parts to be connected are provided with a pair of rockably associated members, one pivotally connected to each of the parts and being free of connection to the other of said parts except through the cooperating rockable member or through a radius rod structure in some instances, spring means cooperating between the members whereby to normally urge them toward a predetermined position of relationship, and both of said members being simultaneously pivotable in the same direction about their respective parts under a load imposed between said parts in such a manner as to reduce the movement which the spring would otherwise be required to accommodate between the members. In this manner the device may adjust itself to properly but still freely yieldably resist relative movement between the parts over a relatively wide range of loads acting between such parts, and to readily yield under slight variation in such load without unduly stressing the spring means. For this reason it will be understood that the invention is particularly adapted for use as a wheel suspension for motor vehicles of the truck or load carrying type wherein in accordance with conventional practice the conventional multi-leaf springs are designed to accommodate the maximum load which the truck is designed to carry with the result that at no load or partial load conditions the springs serve little if any use and their rigidity is such as to subject the chassis and all parts carried thereby to violent shocks and vibrations detrimental to the mechanism thereof. The same effect is, of course, apparent in passenger carrying types of motor vehicles although usually to a smaller degree.

In contrast to conventional wheel suspensions, the present invention provides a wheel suspension which is readily yieldable under all conditions of loads so as to readily absorb the shock which would otherwise be transmitted from the road surface to the vehicle chassis regardless of the condition or magnitude of the load thereon within reasonable but relatively wide limits. Because of its construction and arrangement it is particularly adaptable to motor vehicles of all descriptions for the reason that irregularities in a road surface act on a motor vehicle travelling thereover in much the same manner as variations in the load of such vehicle would act as regards the wheel suspension means thereof and, accordingly, the construction provided by the present invention in being readily yieldable to large variations in load is likewise yieldable to a greater extent than conventional spring structures for wheel suspension purposes and for that reason is capable of accommodating itself to relatively great irregularities in road surface conditions without causing a movement of the vehicle chassis and parts carried thereby commensurate with those obtained by the use of conventional wheel suspensions.

In the following specification the explanation of the present invention will be limited almost entirely to the application of the same to the wheel suspension for motor vehicles, this being merely illustrative of its general use and because it perhaps offers the widest field of use of the present invention, but once the teachings of the present invention are made known to those skilled in the art its application to innumerable other applications will be readily understood.

Referring to Figs. 1 to 4, inclusive, which show an application of the present invention to a steering road wheel of a motor vehicle, the numeral 40 illustrates a chassis frame side member of a motor vehicle, the same being shown of conventional channel section. Secured to the lateral outer face of the frame member 40 is a box 42 having a cover 44. Fixed to the upper and lower faces of the frame side members respectively are a pair of bracket members 46 each provided with a laterally outwardly projecting extension 48, and rotatably received between and fixed against axial movement in the outer ends of the projections 48 is a vertically disposed splined shaft 50. The axis of the shaft 50 may be disposed in a truly vertical relation but is preferably inclined outwardly and forwardly with respect to the longitudinal axis of the motor vehicle so as to obtain the desired caster effect of the steering road wheel for well known reasons and may also be inclined to obtain a desired degree of camber. A sleeve member 52 having a bore formed complementary to the splined exterior of the shaft 50 is axially slidably but relatively non-rotatably mounted thereon between the extensions 48 and is provided with an integral laterally projecting spindle 54 which corresponds to a conventional steering wheel spindle of a motor vehicle and upon which a road wheel of the motor vehicle is adapted to be rotatably mounted against relative axial movement in a conventional manner.

The box 42 may be formed integral with the brackets 46 or may be formed separately therefrom and independently secured to the frame side member 40, or may be formed separately from the brackets 46 and thereafter welded or otherwise suitably fixed in relation thereto.

Figures 1, 2:
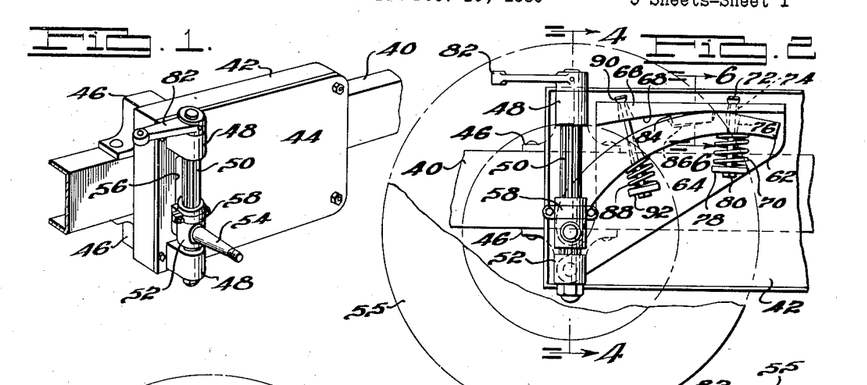
Fig. 1 is a broken perspective view of an automobile chassis side frame member upon which is mounted a structure formed in accordance with the present invention for supporting a steering wheel of a motor vehicle and permitting the same to be turned in order to guide the path of movement of the vehicle upon a road surface.
Fig. 2 is an enlarged partially broken side elevational view of the construction shown in Fig. 1 but with the cover of the structure removed to disclose the mechanism in back of the same, the mechanism being shown in the position it will normally assume when stationary and when supporting a normal load.
Figures 3, 4, 5, 6, 7, 8, 9, 10:
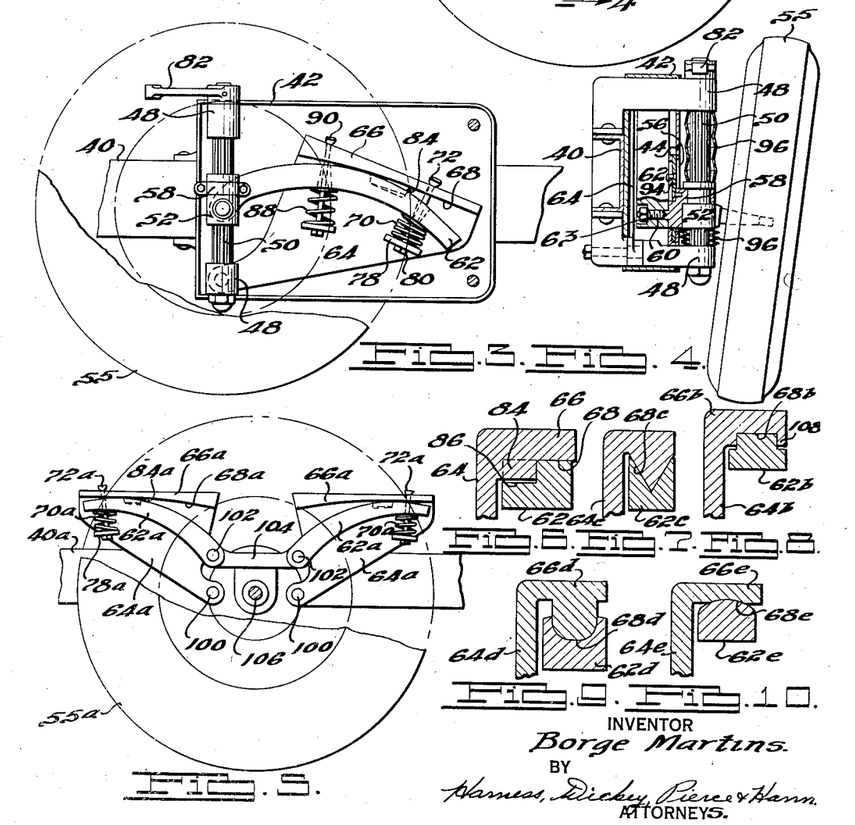
Fig. 3 is a view similar to Fig. 2 but showing the mechanism in a position it may assume under an abnormal load, such as may be caused from striking an unevenness or an obstruction in a road surface, or by reason of carrying an excessively heavy load.
Fig. 4 is a vertical transverse sectional view taken on the line 4—4 of Fig. 2.
Fig. 5 is a partially broken, side elevational view of an application of the invention to the support of a non-steering vehicle wheel and in which a pair of suspension units similar to that illustrated in the foregoing views is employed for supporting a single wheel.
Fig. 6 is a fragmentary, enlarged, transverse sectional view taken through the rocker bar and track assemblies shown in Fig. 2 as on the line 6—6 thereof.
Figs. 7 to 10, inclusive, are views similar to Fig. 6 but illustrating various modifications of the structure of the rocker bar and track assemblies.

The cover 44 for the box 42 is provided with a vertical slot 56 therein laterally aligned with a shaft 50. Rotatably mounted upon the collar 52 but held against relative axial movement with respect thereto in any suitable manner such as fitting into an annular recess therein as best illustrated in Fig. 4 is a second collar member 58 having a lateral extension or pin 60 projecting inwardly through the slot 56 into the interior of the box 42. Pivotally mounted upon the extension 60 within the box 42 is a rocker member 62 maintained against axial movement thereon by means of a nut 63. Also positioned within the box 42 and pivotally mounted upon the inner end of the lower extension 48 for movement in the same plane as the rocker 62 is a plate-like member 64 which extends upwardly in the box 42 and at its upper end is provided with a lateral flange or extension 66 providing on its under-surface a trackway 68 for the rocker 62. As will hereinafter be more apparent the trackway 68 may be perfectly straight in side elevation, may be slightly convex in side elevation, or may be slightly concave in side elevation as illustrated in Fig. 2 so long as the cooperating surface of the rocker 62 is such as to co-act therewith to obtain the desired rocking action between them.

The upper surface of the rocker 62 is constantly urged against and maintained in contact with the trackway 68 by means of a compression spring 70. This compression spring 70 is maintained in position and rendered constantly effective by means of a spherically headed bolt 72 arranged near the outer or free end of the rocker 62 and projecting through suitable openings 74 and 76 in the flange 66 of the plate member 64 and outer end of the rocker 62 respectively, the openings 74 and 76 being suitably flared as indicated to provide the necessary clearance for the bolt 72 in the various operative positions of the members 62 and 64 as will hereinafter be more apparent. The spring 70 encircles the bolt 72 below the lower face of the rocker 62 and is maintained under compression between such lower face and a washer 78 secured against outward axial displacement on the bolt 72 by means of a nut 80.

The shaft 50 above the upper extension 48 has suitably non-rotatably fixed thereto an arm 82 adapted to be connected to a suitable or conventional type of steering mechanism (not shown) by means of which the rotatable position of the shaft 50 and consequently the steerable position of the corresponding wheel 55 may be manually controlled by the operator of the vehicle for steering purposes.

In the operation of the device thus far described it will be understood that the proportional weight of the vehicle to be supported by the wheel 55 is transmitted from the vehicle chassis through the frame side member to the lower bracket 46, to the plate member 64 and thence through the rocker 62, sleeves 52 and 58 and spindle 54 to the wheel 55. Consequently the point fixed with respect to the vehicle frame at which the proportionate weight of the vehicle is transmitted to the wheel spindle 54 is below the wheel spindle 54 and, consequently, due to the force of gravity always tends to maintain the axis of the wheel spindle 44 in vertical alignment with respect to the pivotal axis of the plate member 64 regardless of the guiding action of the shaft 50 with respect to these parts.

Under normal load conditions with the vehicle at rest the tension of the spring 70 is preferably so adjusted as to maintain the parts in the relative positions indicated in Fig. 2 from which it will be noted that the compressive action of the spring 70 is exerted outwardly relative to the pivotal axis of the rocker 62 with respect to the point of contact of the rocker 62 with the trackway 68. Consequently the proportionate weight of the vehicle carried by the wheel 55 in acting downwardly relative to the axis of the wheel spindle 54 tends to cause the rocker 62 to rotate in a counterclockwise direction about its pivotal axis as viewed in Figs. 2 and 3 and this tendency is balanced by the compressive force of the spring 70.

If the various parts are in the relative positions indicated in Fig. 2 and an added load is imposed upon the wheel 55, either by reason of an additional actual mass being applied to the motor vehicle of which this device forms a part, or by reason of the wheel 55 striking an obstruction while travelling over a road surface, the corresponding portion of the frame side member 40 will be placed under an added force tending to move it downwardly with respect to the road surface, and in moving downwardly to carry the brackets 46 and consequently the pivotal axis of the plate 64 downwardly with respect to the axis of the wheel spindle 54. Under such conditions if the plate member 64 was not permitted to swing about its pivotal connection with the lower bracket extension 48, such relative movement between the plate member 64 and wheel spindle 54 could be accommodated only by rocking action of the rocker 62 on the trackway 68 and this would result in a relatively wide separation of the rocker 62 and flange 66 along the axis of the bolt 72 in order to accommodate a relatively large increase in the load tending to separate them at this point and the construction would, therefore, be open to the same objection as the construction in my prior application above identified in that an excessively long spring 70 would then be required to accommodate the desired amount of relative vertical movement between the frame side member 40 and wheel spindle 54. The pivotal mounting of the plate 64 upon the lower extensions 48 in the present case avoids this disadvantage of my prior construction under such conditions in that as the described load on the wheel 55 is increased the plate member 64 swings simultaneously with the rocker 62 in a clockwise direction from a position such as indicated in Fig. 2 to a position such as indicated in Fig. 3, a relative rocking occurring between the rocker 62 and plate member 64 because of the fact they are pivoted about vertically separated lines but the degree of rocking movement thus permitted being materially less than the corresponding rocking movement necessary to provide an equal variation in vertical movement between the wheel center and frame as compared to my former construction as disclosed in my previous patent application above identified. In fact the amount of relative rocking movement between the two rockably associated members is so reduced by the practice of the present invention that the spring 70 may be made relatively short and compact, to such an extent that provision for its bulk offers little if any problem whatever. Furthermore, because of the relatively small amount of rocking movement between the rocker 62 and plate member 64 in accordance with the practice of the present invention as compared to my former construction, the various parts and particularly the rockably associated members may be relatively reduced in size to a material degree, thus permitting a more compact construction as well as providing one more economical to produce.

It will also be observed that with the construction thus described the proportionate weight of the vehicle carried by the wheel 55 in tending to cause a relative rocking action of the rocker 62 on the trackway 68 in opposition to the force of the spring 70 acts through a lever arm equal to the horizontal distance between the axis of the pin 60 and the point of rocking contact between the rocker 62 and the trackway 68 and is opposed by the force of the spring 70 then exerted acting through a horizontal direction equal to the distance of the axis of the bolt 72 from such point of rocking contact between the rocker 62 and trackway 68. As the load on the wheel 55 is increased the lever arm through which such load acts to rock the rocker 62 in opposition to the force of the spring 70 obviously will decrease while the above described lever arm through which the spring 70 is effective to resist such rocking action simultaneously increases. These lever arms thus automatically correspondingly vary in an opposite sense so as to permit the spring 70 to easily resiliently resist wide variations of the load upon the wheel 55 and yet permit such variations of load to effect a material variation in the relative vertical position of the frame 40 and wheel spindle 54 so as to easily and softly absorb such variations in load and, therefore, reduce the shock and jar which would otherwise be apparent in the vehicle chassis and parts carried thereby. It will be understood that this is a material advantage and compared to conventional multiple leaf spring structures commonly employed in vehicle wheel suspensions and which must necessarily be designed to provide optimum springing conditions for a relatively narrow range of load variations on the corresponding wheels, and in which should such predetermined accommodated weight be either lacking or exceeded the effectiveness of the structure is materially nullified. As will be apparent to those skilled in the art, by properly correlating the curvature of the effective face of the rocker 62 and of the trackway 68 it is possible to obtain an equal deflection between the wheel spindle 54 and chassis frame 40 with the present invention for the same amount in variation of the load on the wheel 55 over an extremely great variation of total load, or any other desired relation between deflection and load, and consequently the effectiveness and "softness" of the spring suspension may thus be obtained over a wide variation of load conditions on the vehicle.

It will be understood that upon variation of load upon the wheel 55 rocking movement between the rocker 62 and plate member 64 will be bound to occur in the above described structure, but it will also be understood that sudden shocks or jars might tend to cause the rocker 62 to slip relative to the trackway 68, and any suitable means, such for instance as illustrated in my prior patent application previously identified, may be employed to prevent such relative slipping. One means for eliminating the possibility of such relative slipping is shown in Figs. 1 to 4, inclusive, and Fig. 6 as comprising a projection 84 formed one one of the rockable members and a cooperating pocket 86 formed in the other thereof. In the particular illustration shown the projection 84 is shown as being formed on the trackway 68 and the pocket 86 as being formed in the rocker 62. Preferably, as illustrated in Fig. 6, the projection 84 and pocket 86 are of a width constituting only a part of the width of the trackway 68 and rocker 62 respectively. Furthermore, the projection 84 and pocket 86 are preferably so formed and correlated that their engaging end surfaces cooperate in the same manner as the teeth of a gear so as to have purely rolling contact with respect to each other and, furthermore, they are preferably of such relative depth as to maintain their proper degree of engagement over the complete range of relative rockable movement of the rockable parts.

In order to snub the rebound action of the foregoing construction when the weight on wheel 55 is suddenly relieved, it will be found desirable in most cases to extend the free end of the rocker 62 a material distance beyond the bolt 72 and to flatten off the surface of such extended portion which cooperates with the trackway 68 so that during such rebound, as soon as the point of rocking contact between the rocker 62 and the trackway 68 reaches the axis of the bolt 72, the point of contact will immediately be transferred to the extreme end of the rocker 62 and thus provide a material leverage arm acted upon by the force of the spring 70 tending to prevent further movement of the rockable parts in such rebound direction. Additionally, a rebound spring in the nature of a shock absorber may be provided as illustrated in Figs. 2 and 4. Such a rebound spring is illustrated at 88 and is caused to cooperate between the rocker 62 and member 64 by means of a bolt 90 and washer 92 in much the same manner as the spring 70, bolt 72 and washer 78 except that in this case the bolt 90 is positioned on the same side of the line of contact between the rocker 62 and trackway 68 as the pivotal connection between the rocker arm 62 and the pivot pin 60, and thus acts in opposition to the spring 70. It will be understood, of course, that the force of the spring 88 is much less than the force of the spring 70 and acts constantly over the entire range of rocking movement between the rocker 62 and member 64.

It will also be recognized that with the above described construction, steering of the wheel 55 may be effected through movement of the lever arm 82 in the manner described regardless of the position of the sleeve 52 and consequently, the spindle 54 with respect to the shaft 50. Consequently with the construction thus provided each of the steering wheels is independently suspended relative to the chassis frame 40 and may be suitably controlled for steering movement of the vehicle. It may be particularly noted that with the construction described the vertical position of the lever arm 82 with respect to the frame side member 40 is constant and consequently no provisions need be made as in conventional constructions in the connection between the steering lever 82 and the cooperating linkages (not shown) for accommodating such relative vertical movement as must be accommodated in conventional constructions.

It will also be observed that with the above described construction the rocker 62 and member 64 are normally enclosed within the box 42 and its cover 44. The slot 56 through which connection is made between the wheel spindle 54 and rocker 62 may be sealed against the entrance of foreign materials by any suitable or conventional means such as sliding plates 94 or the like not shown. Additionally, the exposed surfaces of the shaft 70 may be sealed against contact with foreign material by means of expandible and contractible fabric or other bellows-like members 96 surrounding the shaft 70 above and below the collar 52 and suitably connected to the collar 52 and cooperating extensions 48, the connection with one or the other of these parts permitting the relative rotation between the collar 52 and extensions 48 occurring during steering movements of the wheel 55. Accordingly, all the operative parts of the construction may be amply sealed against contact with dirt, dust or other foreign material, and the necessary lubricant for the operative parts of the mechanism be maintained in contact with the parts.

It will be noted that the above described construction provides a unit which may be applied to and removed from a motor vehicle as such. In other words, the brackets 46, box 42, extensions 48, shaft 50, rocker 62, plate member 64, collar 52 and spindle 54, with or without the cooperating wheel 55, may be assembled and applied to the frame as a unit by riveting, bolting, welding or the like, and may be removed as a unit by simply removing such fastening means. This feature is desirable from a manufacturing, assembling and servicing standpoint.

In Fig. 5 is illustrated one application of the present invention to the non-steering wheels of the vehicle. In Fig. 5 parts equivalent to the parts shown and described in Figs. 1 to 4, inclusive, bear the same numerals except that such numerals are accompanied by the sub-letter "a." It will be observed that in this figure two units of the general type above disclosed are employed in suspension of the one wheel 55a. The plate member 64a in this modification is pivotally connected directly to the frame side member 40a as at 100 and the rockers 62a are pivotally connected at 102 to a bracket member 104 fixed relative to the usual housing for the axle 106. This construction gives a balanced effect which is highly desirable particularly with heavy type of motor vehicles. No provision is made for steering movement of the wheel 55a with respect to the frame 40a in this construction, as is provided in the construction illustrated in Figs. 1 to 4, inclusive, for the reason that wheel 55a being a non-steering wheel no such movement is required. It will, of course, be understood that the springing action of the construction shown in Fig. 5 will be identical to that disclosed in Figs. 1 to 4, inclusive, and that the use of an enclosing box structure, shock absorbing springs and like features disclosed in Figs. 1 to 4, inclusive, may be included in this structure if desired.

In applications of the foregoing yieldable connection where, because of conditions of operation or otherwise, it is not necessary or desirable to employ an enclosing box-like structure such as 42 and 44 disclosed in Figs. 1 to 4, inclusive, and which box-like structure serves to guide the members 62 and 64 in their rocking movement, and even under some circumstances where such box-like enclosure is provided, it may be desirable, in order to prevent relative lateral displacement between the rocker and the plate member, to provide a construction such as is illustrated in Fig. 8. As will be noted in this figure the rocker member 62b seats in and is laterally confined between the side edges of a recess 108 formed in the under face of the flange 66b of the plate member 64b, the bottom of the recess 108 forming the trackway 68b. On the other hand, the trackway 68c as illustrated in Fig. 7 may comprise a pair of angularly related surfaces which may be, for instance, of V formation in section as illustrated, and the cooperating surface of the rocker 62c formed complementary therewith. On the other hand the trackway on the plate member may be made convex in section as illustrated at 68d in Fig. 9 or convex as illustrated at 68e in Fig. 10 and the cooperating surface of the rockers 62d and 62e respectively formed complementary therewith. Particularly the constructions illustrated in Figs. 9 and 10 will permit a slight amount of twisting or warping of the rocker arm due to variations of load upon it. Such twisting effect particularly may occur in constructions such as illustrated in Fig. 5 where the opposite wheels of the vehicle may be tied together through an axle or axle housing (not shown), because of variations in road surface on opposite sides of the vehicle or to variations in load at opposite sides of the vehicle.

In Figs. 11 to 16, inclusive, various modifications of the present invention applied to non-steering wheels of a motor vehicle are illustrated. In these views parts equivalent to the parts shown in Figs. 1 to 4, inclusive, are illustrated by the same numerals except that they bear different sub-letters to distinguish them one from the other and from the construction shown in Figs. 1 to 4, inclusive.

Figure 11:
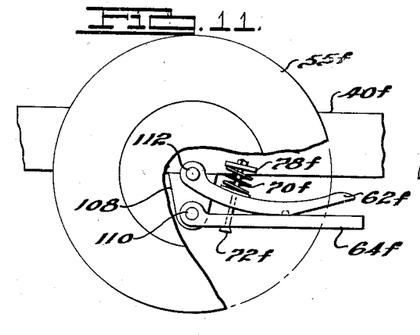
Figs. 11 to 16, inclusive, are fragmentary, broken and more or less diagrammatic side elevational views of modified forms of construction of the invention shown in the previous views, applied to non-steering wheels of a vehicle.

Referring to Fig. 11 it will be noted that a bracket 108 is fixed to the chassis frame side member 40f and that the member 64f is pivoted thereto as at 110. In this case the member 64f is in the form of a bar member rather than a plate member as in the previously described construction. The rocker member 62f is pivotally connected at 112 relative to the axle for the wheel 55f. It may be noted that in this construction, particularly if a Hotchkiss type of drive is employed for the road wheel 55f, a slight amount of fore and aft movement of the wheel 55f with respect to the chassis frame 40f may occur during operation, this will be of advantage the same as in any type of Hotchkiss drive instead of a disadvantage. It will be observed that the proportionate weight of the vehicle on the wheel 55 in being transmitted to the spring suspension means at a point below the pivotal connection between the rocker arm 62f and the wheel will always tend to maintain the pivotal axis 112 in vertical alignment with the pivotal axis 110 and thus while yielding under variations of pull between the wheel 55 and frame 40f, will be constantly urged at all times by the force of gravity acting upon the load on the wheel towards its normal position shown.

Figure 12:
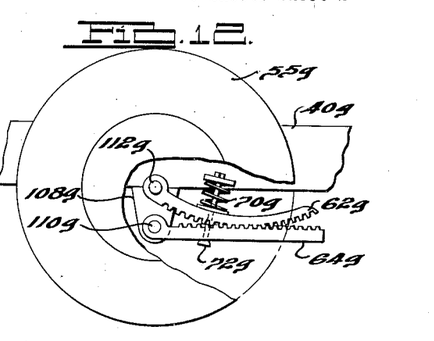

In Fig. 12 a form of construction very similar to that illustrated in Fig. 11 is shown with the exception that the cooperating surfaces of the members 62g and 64g are formed to provide a sufficient number of projections and cooperating pockets, similar to the projection 84 and pockets 86 illustrated in Figs. 1 to 4, inclusive, and Fig. 6, to form in effect interengaging racks. This general type of construction is illustrated in my prior patent application heretofore identified and is of advantage primarily because the teeth of the rack may be made of relatively small size and yet insure proper engagement between the rocking members throughout their entire range of movement which, of course, is identical to that shown in Fig. 11.

Figure 13:
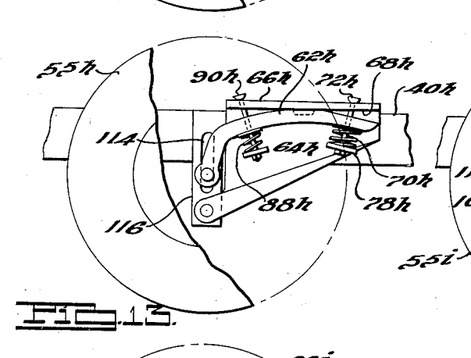

In Fig. 13 a construction is illustrated in which the pivot pin for the rocker 62h is guided for true vertical movement in a vertical slot 114 formed in a co-acting bracket 116 rigidly fixed to the vehicle's side member 40h. As will be understood, in this construction all driving and braking action on the wheel 55h is transmitted directly to the frame 40h through the bracket 116.

Figures 26, 27:
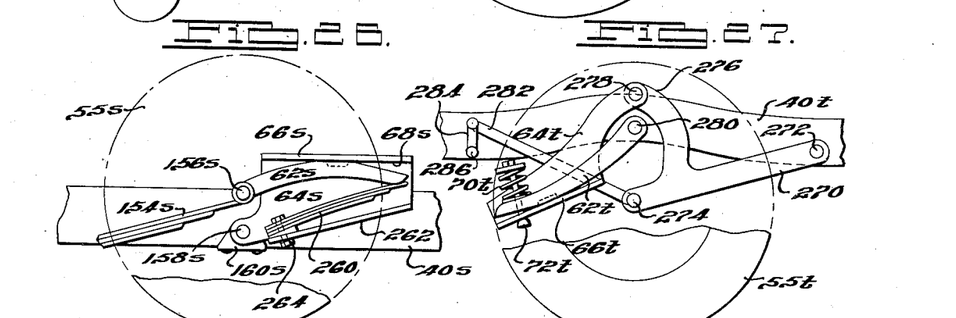
Fig. 26 is a view similar to Fig. 17 but showing a modified form of construction.
Fig. 27 is a view similar to Fig. 16 and illustrating a modified form of the construction shown therein.

It will, of course, be understood that spring means of a type other than coil springs, such as the coil spring 70 shown, may be employed in place of the coil spring 70 by obvious rearrangement of parts. In other words, leaf springs, torsion springs, cooperating bowed springs or the like may be employed. As a matter of illustration two examples of the use of leaf springs are shown in Figs. 14 and 26.

Figure 14:
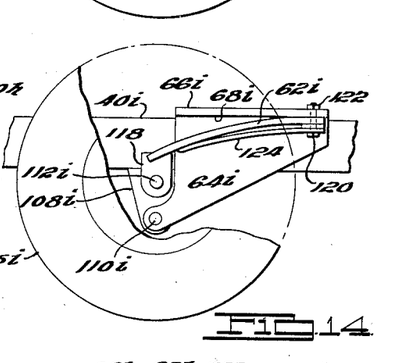

In Fig. 14 a construction is shown which is similar to that shown in Fig. 13 except that the rocker member 62i is itself formed as a leaf spring and consequently eliminates the necessity of a spring 70 such as is employed in the previously described constructions. In this case the inner end of the rocker member 62i is fixed to a bracket 118 which in turn is pivotally connected at 112i to the axle housing. The opposite end of the rocker 62i is rigidly fixed as by means of a bolt 120 and nut 122 to the under face of the flange 66i constituting the trackway 68i. With this construction, as the load on the wheel 55i increases the rocker 62i, because of its spring-like characteristic, is caused to flatten out and thereby cause the effective point of contact between it and the track 68i to approach the inner end of the spring, thereby providing the same general type of action as in the constructions previously described. With this construction a shock absorbing leaf spring such as 124 acting in opposition to the effect of the spring-like rocker 62i may be employed instead of a spring such as 88 previously described, and may be secured in place and rendered operative by being secured in position by the same bolt 120 and nut 122 that secures the rocker 62i in position on the flange 66i as above described.

Figures 15, 16, 17:
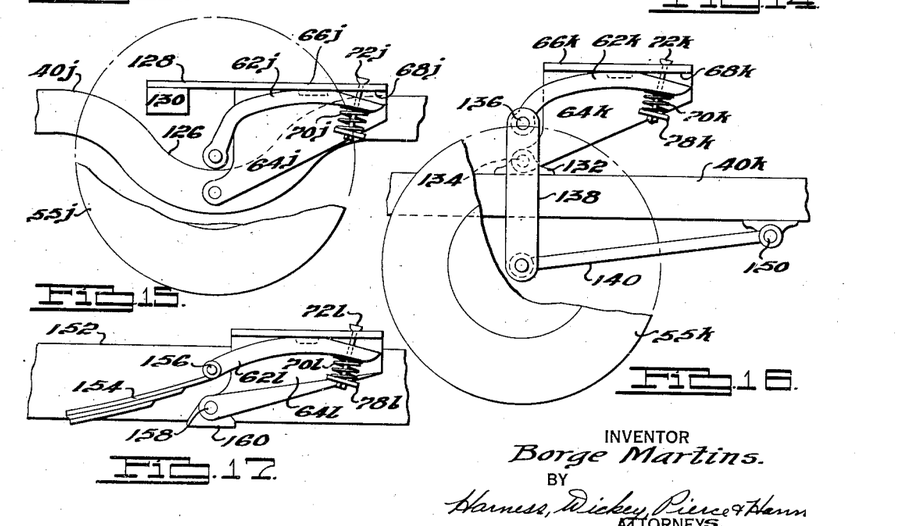
Fig. 17 is a fragmentary and more or less diagrammatic side elevational view of an application of the present invention between the eye at one end of a conventional multiple leaf vehicle spring and a conventional spring hanger.

In Fig. 15 is illustrated a construction somewhat similar to that shown in Fig. 5 except one unit only is provided and the frame side member 40j in this case is downwardly curved as at 126 so as to permit the point of pivotal connection between the rocker 62j and the axle housing to pass over the top of the frame side members. This figure also discloses an additional feature which may sometimes be desirable where a single unit is employed. It will be observed, for instance, in the constructions illustrated in Figs. 11 to 14, inclusive, that the weight unit is entirely to one side of the pivotal axes of the members 64 and 62 and consequently the weight of these members acting under the force of gravity will constantly tend to rotate them downwardly about their pivotal axes. To offset this tendency the flange 66j of the member 64j in Fig. 15 is extended as at 128 to the opposite side of the above described pivot point and is there provided with a counterbalance mass 130 to offset the effect above described.

In Fig. 16 is shown a construction including a unit of the same general type as disclosed in Fig. 15 except that no counterbalance is employed and in this case the unit is mounted above the chassis frame side rail 40k. In other words a bracket 132 is fixed to the top face of the chassis frame side rail 40k and the plate member 64k is pivotally connected thereto at 134. The rocker 62k is pivotally connected at 136 to a vertically extending link 138 which extends downwardly therefrom and is suitably fixed to the axle housing for the wheel 55k. Where the unit is arranged in the manner shown it is necessary in order to maintain the proper longitudinal relation between the wheel and frame to provide additional means for transmitting the driving and braking thrust from the wheel 55k to the chassis frame and, accordingly, a radius rod 140 is pivotally connected to the frame 40j at 150 and also to the axle housing for the wheel 55. This construction places the unit above the frame where it may be desirable under certain conditions.

Attention is called to the fact that in the construction shown in Figs. 1 to 6, inclusive, the trackways 68 are curved in side elevation while in the construction shown in Figs. 11 to 16, inclusive, the corresponding trackways are straight in side elevation. As previously mentioned, in the broader aspects of the invention the particular shape of the trackway 68 is more or less unimportant so long as the effective rocking action between the rocker 62 and the trackway 68 provides the desired resistance or yieldability to relative movement between the two interconnected relative movable parts. Those skilled in the art will readily recognize the possibility of varying the curvature of the cooperating surfaces of the rockable members to obtain any desired reaction or characteristics of the spring suspension herein disclosed.

In Fig. 17 is illustrated an application of the present invention to existing leaf spring wheel suspensions of conventional construction. Application of the present invention in this respect serves to materially improve the riding characteristics of conventional spring constructions and serves to a greater or lesser degree as a shock absorbing means therefor. Referring to Fig. 17 the vehicle chassis frame side member is illustrated at 152 and the wheel suspension as including a multiple leaf spring 154 connected adjacent its center in a conventional manner to a road wheel not shown. Instead of providing a conventional spring shackle to connect the end of the leaf spring 154 to the chassis frame side member 152 such end of the spring 154 is pivotally connected at 156 to a rocker 62—l which cooperates with a plate 64—l in substantially the same manner as the previously described constructions. The plate member 64—l is in turn pivotally connected at 158 to a bracket 160 fixed to the frame side member 152. The spring 70—l may be of such strength as to permit rocking of the two rockable members relative to one another under relatively slight variation in the load on the vehicle, or it may be so designed as to supplement the action of the leaf spring 154 after it has been stressed to approximately its maximum designed load position.

In Figs. 18 to 24, inclusive, various modifications of the present invention applied to independently sprung steering road wheels of a motor vehicle are disclosed.

Figures 18, 19:
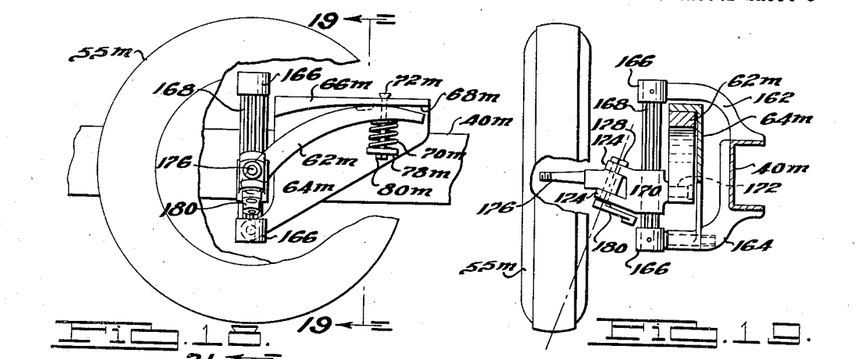
Fig. 18 is a fragmentary, partially broken and more or less diagrammatic side elevational view showing a modified form of the present invention applied to the steering road wheel of a motor vehicle.
Fig. 19 is a partially broken, more or less diagrammatic vertical sectional view of the construction shown in Fig. 18, taken as on the line 19—19 thereof.

In the construction illustrated in Figs. 18 and 19 brackets 162 and 164 are fixed to the vehicle chassis frame side rail 40m and are projected outwardly therefrom to provide a pair of vertically spaced end portions 166 between which a splined shaft 168 is supported and secured in fixed relation. The plate member 64m is pivotally mounted upon the lower bracket 164 in much the same manner as the plate member 64 is mounted in the construction shown in Figs. 1 to 4, inclusive. A sleeve member 170 having a bore formed complementary to the exterior surface of the splined shaft 168 is nonrotatably mounted thereon for vertical movement axially of the shaft 168 and is provided with an inwardly extending pin 172 upon which the rocker 62m is pivotally mounted. The sleeve member 170 is provided with a pair of outwardly projecting flanged portions 174 between which a steering spindle member 176 is received and pivotally secured thereto by means of the kingbolt 178. The wheel 55m is rotatably mounted upon the spindle 176 in a conventional manner. In the particular case shown the kingbolt 178 is inclined to the vertical so that its axial extension intersects the road surface at the point of connection of the wheel 55m therewith, although it will be understood that this feature may vary in accordance with conventional practice or the desires of the individual designer. The kingbolt 178 is rotatable in the flanged portions 174 and fixed with respect to the spindle member 176 and projects below the lower flange member 174 and is there provided with a lever 180 through which the steering movement of the wheel 55m may be controlled in the conventional manner. It will be observed that in this construction the rockable members 62m and 64m do not turn during steering movements of the wheel 55m but that the wheel 55m turns independently of them.

Figures 20, 21:
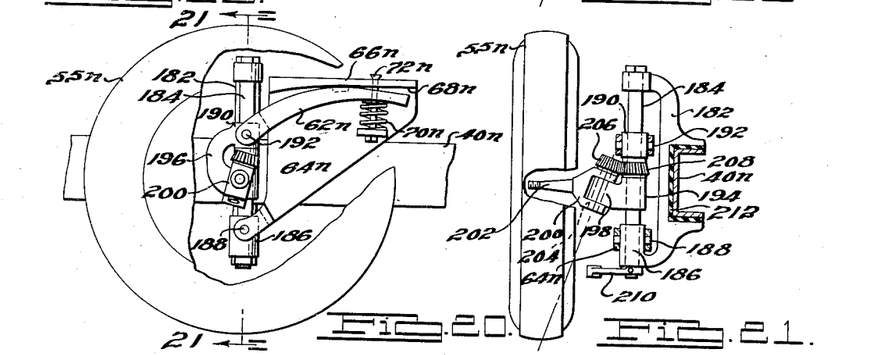
Figs. 20 and 21 are views corresponding to those shown in Figs. 18 and 19 respectively, illustrating another modified form of wheel suspension for the steering road wheel of a motor vehicle, Fig. 21 being taken on the line 21—21 of Fig. 20.

In the construction illustrated in Figs. 20 and 21 a yoke-like bracket member 182 is secured to the chassis frame side rail 40n and rotatably received between the ends of its spaced arm portions is a vertically disposed shaft 184 preferably having an uninterrupted exterior cylindrical surface. The rocker 62n and plate member 64n, in this construction as well as other constructions shown where the weight transmitted by the cooperating road wheel tends to apply a twisting stress on the connection between the wheel spindle carrying member and its cooperating member, can, if desired, be placed between the guide 184 and wheel 55n so as to counteract such twisting stress, but as a matter of convenience in the present case the rocker 62n and plate member 64n are shown pivoted centrally of the guide 184. The plate member 64n in this instance is provided with a yoked lower end which straddles the upper extension 186 of the lower yoke arm and is pivotally connected thereto by means of pins 188. It will be observed that by this construction the plate member 64n is constrained in its pivotal movement about the pin 188 to a plane parallel with the frame side member 40n. The pivoted end of the rocker 62n in this construction is also yoked and straddles a sleeve 190 which is axially slidably and relatively rotatably mounted upon the shaft 184 and is pivotally connected to the sleeve 190 by means of pins 192. A second sleeve-like member 194 is also axially slidably and relatively rotatably mounted upon the shaft 184 below the sleeve 190 and is fixed in relation thereto by means of a connecting member or portion 196. Because of the fact that the plate member 64 is constrained in its pivotal movement to a plane parallel with the outer face of the chassis frame side member 40n, the rocker 62n will likewise be constrained in its pivotal movement to the same plane and because of the mode of connection of the rocker 62n, the sleeves 190 and 194 will also be held against rotation with respect to the frame side member 40n. The sleeve member 194 is provided with an extension 198 upon which is mounted the steering knuckle 200 carrying the wheel spindle 202 for rotatably mounting the wheel 55n, by means of a kingbolt 204. The kingbolt 204 is fixed relative to the steering knuckle 200 and to its upwardly projecting end is secured a gear 206. A gear 208 encircling the shaft 184 between the sleeves 190 and 194 is fixed to the shaft 184 therebetween and lies in mesh with the gear 206. The lower end of the shaft 184 projects below the bracket extension 186 and is there provided with a steering lever 210 fixed thereto which may be connected in a suitable or conventional manner to a conventional type of steering mechanism not shown. With this construction it will be observed that turning of the shaft 184 by means of the lever 210 will cause simultaneous rotation of the gears 206 and 208 and consequent rotation of the steering knuckle 200 and steering movement of the wheel 55n about the axis of the kingpin 204, and that this movement occurs without causing a corresponding swinging movement of the rockable members 62n and 64n about the axis of the shaft 184.

As will be understood by those skilled in the art, the resilient and/or vibration deadening effects of rubber or other suitable non-metallic material may be made use of in connection with the present invention, at any desired location in the structure thereof, either to permit relative yielding between two or more parts thereof or to lessen the transmission of audible or other vibrations therein to the chassis frame. For instance, as a matter of illustration only, in Fig. 21 a rubber pad 212 is shown interposed between the bracket 182 and the chassis frame side member 40n for the above described purpose.

Figures 22, 23:
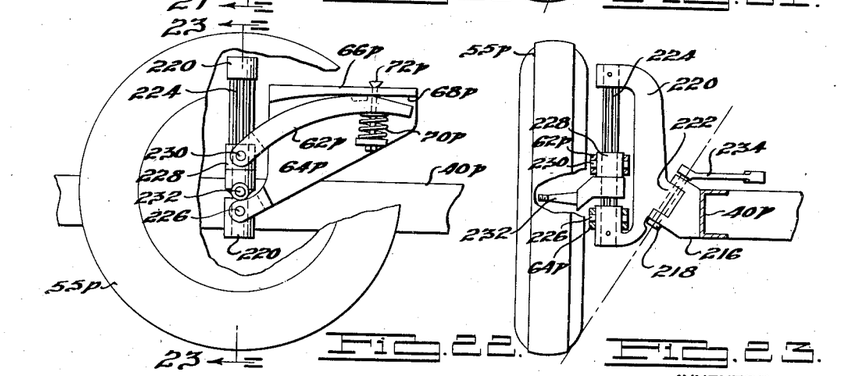
Figs. 22 and 23 are views corresponding to Figs. 18 and 19 respectively, illustrating another modified form of a wheel suspension for the steering road wheel of a motor vehicle, Fig. 23 being taken on the line 23—23 of Fig. 22.

In the construction illustrated in Figs. 22 and 23 a laterally outwardly projecting bracket member 216 is fixed to the chassis frame side member 40p and its outer end is yoked for pivotal reception of the kingpin 218 which, if desired, may be arranged on an angle such as illustrated so that its axial extension approaches intersecting relation with respect to the point of contact of the wheel 55p with the ground. A yoke-like bracket member 220 is provided with an extension 222 which is received between the yoke ends of the bracket 216 and fixed to the kingpin 218 therein. A vertically disposed splined shaft 224 is fixed in position between the opposite arms of the yoke member 220 and the plate member 64p is pivotally secured by means of pins 226 to the lower arm of the yoke 220 in a manner similar to that employed in the construction shown in Figs. 20 and 21. A sleeve member 228 having a bore complementary in shape to the exterior surface of the splined shaft 224 is axially slidably but relatively non-rotatively received on the shaft 224 and the rocker 62p is pivotally connected thereto by means of the pins 230. The sleeve member 228 is provided with a laterally outwardly projecting spindle 232, upon which the wheel 55p is rotatably mounted in accordance with conventional practice. The kingpin 218 is provided with a steering arm 234 adapted to be connected with a conventional steering mechanism in accordance with conventional practice. With this construction it will be observed that the unit including the bracket 220, rocking members 64n and 62n and their cooperating parts including the wheel spindle 232 are pivotable about the axis of the kingpin 218 and consequently the rockable members turn with the wheel 55p in its steering movement.

Figures 24, 25:
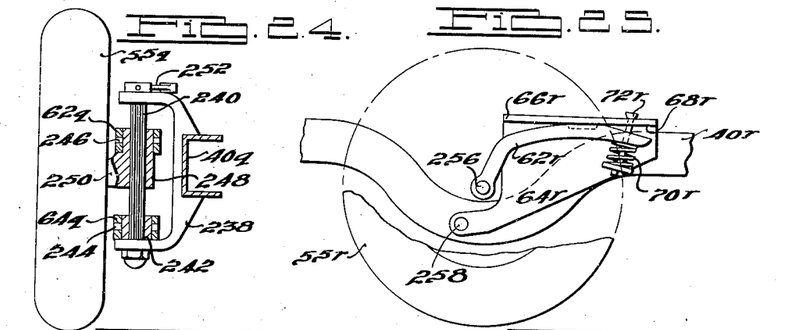
Fig. 24 is a view similar to Figs. 19, 21 and 23 illustrating another modified form of construction.
Fig. 25 is a view similar to that shown in Fig. 15 but illustrating a modified form of the structure shown therein.

In the construction illustrated in Fig. 24 a yoke-like bracket 238 is fixed to the chassis frame side member 40q and a vertically disposed splined shaft 240 is rotatably but axially immovably supported between the yoked ends thereof. A collar member 242 suitably fixed against axial movement to the lower end of the shaft 240 is pivotally connected by means of pins 244 to the plate member 64q which may be identical to that shown in Figs. 18 to 23, inclusive. The rocker member 64q, which may be of identical construction to that shown in Figs. 18 to 23, inclusive, is pivotally connected by means of pins 246 to a sleeve member 248 relatively non-rotatably but slidably received on the shaft 240. The sleeve member 248 is provided with a spindle portion 250 upon which the wheel 55q is rotatably mounted in a conventional manner. A steering arm 252 is fixed to the upper end of the splined shaft 240 and is adapted to be connected to a conventional type of steering mechanism for controlling the rotatable position of the shaft 240 and consequently the steerable position of the wheel 55q. It will be observed that in this construction, as in the construction shown in Figs. 22 and 23, the rockable members 64q and 62q turn with the wheel 55q in its steering movement. In passing it may be noted that all of the steering constructions shown and described could also be employed for non-steering purposes, simply by eliminating the kingpin and fixing the parts shown pivotally connecting thereby, together.

In Fig. 25 a construction similar to that shown in Fig. 13 is illustrated with the exception that the extension 128 and counterbalance 130 is eliminated and instead the pivotal point of connection 256 of the rocker 62r with the axle housing for the rear wheels 55r is offset longitudinally of the vehicle with respect to the pivotal point of connection 258 of the plate member 64r with the vehicle frame side member 40r, the pivotal point of connection 258 being longitudinally offset from the pivotal point 256 on the opposite side thereof from the mass of the plate member 64r and rocker 62r. This offset relation of the pivotal axes 256 and 258, which is shown in exaggerated form in Fig. 25, may be applied to all of the constructions shown herein and is for the same purpose as the counterbalance weight 130 in Fig. 13. In the construction shown in Fig. 25 it will be apparent that the mass of the rocker arm 62r and plate member 64r will tend to swing these members in a clockwise direction of rotation about their pivotal axes. The proportionate weight of the vehicle acting on the pin 258 will, however, tend to move the pin 258 in a counterclockwise direction of rotation with respect to the axis of the pin 256 and the amount of offset between the pins 256 and 258 may be so arranged as to completely balance, or even over-balance, the effect of the off-center mass of the rocker members 62r and 64r and associated parts as will be readily apparent.

In Fig. 26 a construction is illustrated of the same general nature as the construction shown in Fig. 17. In this case instead of employing a coiled spring such as 70—1 in Fig. 17 a multiple leaf spring 260 is employed. For this purpose the plate member 64s is provided at its lower edge with a laterally projecting flange 262 to which one end of the leaf spring 260 is secured by means of a bolt 264 at that end thereof closest to the pivot point 158s. The opposite or free end of the leaf spring 260 bears against the curved extremity of the rocker 62s and thus functions in identically the same manner as the spring 70—1 in the construction shown and described in connection with Fig. 17. This leaf spring arrangement may be employed to replace the coil spring 70 in all the constructions shown herein.

In Fig. 27 a construction is shown somewhat similar in principle to the construction shown in Fig. 16. In other words a radius rod 270 is pivotally connected to the vehicle frame side member 40t as at 272 and is pivotally or otherwise secured to the axle for the rear wheel 55t at 274. The radius rod 270 is provided with an upwardly extending curved integral extension 276 to which the plate member 64t is pivotally connected at 278. The rocker arm 62t is pivotally connected to the vehicle frame side member 40t at 280. With this construction the radius rod 270 transmits all of the braking and driving reaction on the wheel 55t to the frame side member 40t and the rocker element and cooperating parts function simply as a resilient connection between the wheel and the frame.

In all of the constructions herein shown and described, where necessary or desirable additional means may be employed to prevent, limit or reduce the possibility of relative bodily movement of the wheels laterally of the chassis frame. While any suitable and/or conventional means may be employed for this purpose, as a matter of illustration of one form only a link 282 is shown pivotally connected to the wheel 55t in Fig. 27 about the same pivotal axis 274 as the radius rod 270, and its opposite end, which extends in a direction from the pivotal axis 274 opposite to that of the radius rod 270, is pivotally connected to a shackle 284 in turn pivotally secured to the frame 40t about an axis 286. The rod 270 and link 282 in this construction serves to prevent side sway in much the same manner as a conventional leaf spring structure.

Figures 28, 29, 30:
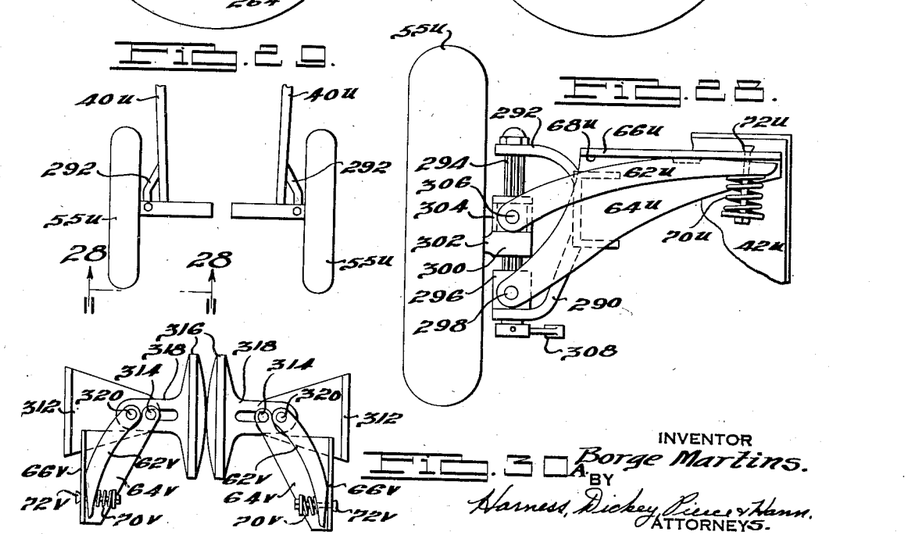
Fig. 28 is a fragmentary, partially broken and more or less diagrammatic front elevational view of a modified form of steering wheel suspension for automobiles in which the plane of movement of the rockable wheel suspension members is transverse to the length of the automobile instead of parallel thereto as in the previous views, and is taken as on the line 28—28 of Fig. 29.
Fig. 29 is a more or less diagrammatic plan view of the front end of an automobile chassis incorporating the construction shown in Fig. 28.
Fig. 30 is a partially broken, fragmentary side elevational view of a further adaptation of the present invention to the steering road wheel of an automobile.

In Figs. 28 and 29 a modification of the present invention for the steering wheels of a motor vehicle is shown in which the rocker 62u and plate member 64u are arranged for movement in a substantially vertical plane extending transversely with respect to the longitudinal axis of the motor vehicle instead of in a plane parallel thereto as in the previously described construction. As will be observed from an inspection of these figures a pair of forwardly and outwardly extending arms 290 and 292 respectively on each side of the vehicle and secured at their rear ends to the corresponding chassis frame side member 40u so as to provide at their forward ends a yoke between which a splined shaft 294 is rotatably mounted and maintained against axial movement. The lower member 292 has fixed thereto a collar 296 in which the shaft 294 is rotatable and the plate member 64u is pivotally connected to such collar by pins 298 for movement in a substantially vertical plane transverse to the longitudinal axis of the motor vehicle. A sleeve member 300 is axially slidably but relatively non-rotatably mounted upon the shaft 294 and is provided with a spindle portion 302 upon which the steering road wheel 55u is mounted in the conventional manner. The sleeve member 300 is provided with a second sleeve member 304 rotatably but relatively fixed against axial movement thereon and the pivoted end of the rocker 62u is pivotally connected to the sleeve 304 by means of a pin 306. A lever 308 fixed to the lower projecting end of the splined shaft 294 is adapted to be connected to a conventional steering mechanism not shown. It will be observed that in this construction the rocker members 62u and 64u are limited in their movement to a substantially vertical plane extending transversely with respect to the axis of the vehicle and do not turn with the wheel 55 as the shaft 294 is turned to control the steering movements of the vehicle.

For the purpose of simply illustrating one of the many additional applications of the present invention other than to wheel suspensions for motor vehicles, in Fig. 30A is shown an application of the present invention to buffers employed between adjacent cars of a train of cars. Such buffers are not commonly employed in connection with American railroad rolling stock but are conventional practice in Europe. It will be understood that in such case the corresponding ends of two cars arranged in end to end relationship are provided with a central coupling and each side of the corresponding car ends are provided with a buffer, the buffers on the two cooperating cars matching with one another and contacting to limit and/or absorb shocks due to play between the cars. Referring to Fig. 30A the brackets 312 are adapted to be secured to the opposed ends of a pair of cars arranged in end to end relationship. To the outer end of each of the brackets 312 a plate member 64v is suitably mounted by means of a pin 314. Each buffer 316 is provided with a slotted shank 318 into which the projecting end of the corresponding pin 14 projects for the purpose of guiding the corresponding buffer 316 in its movable position. The corresponding rocker member 62v is pivotally connected by a pin 320 with the free extremity of the corresponding shank 318. As will be observed when the cars to which the brackets 312 are secured are coupled together the buffers 316 will contact with one another and will cause an initial separation of the corresponding pins 314 and 320, placing the corresponding springs 70v under compression. Thereafter during operation of the cars, whether rounding curves, or because of relative movement between the couplings for the two cars during starting, stopping, or the like, the buffers will react against one another and any relative movement between the bracket 312 will be resiliently resisted in a manner equivalent to that in the previously described applications of the invention to wheel suspension systems.

Figures 30, 31, 32, 33, 34:
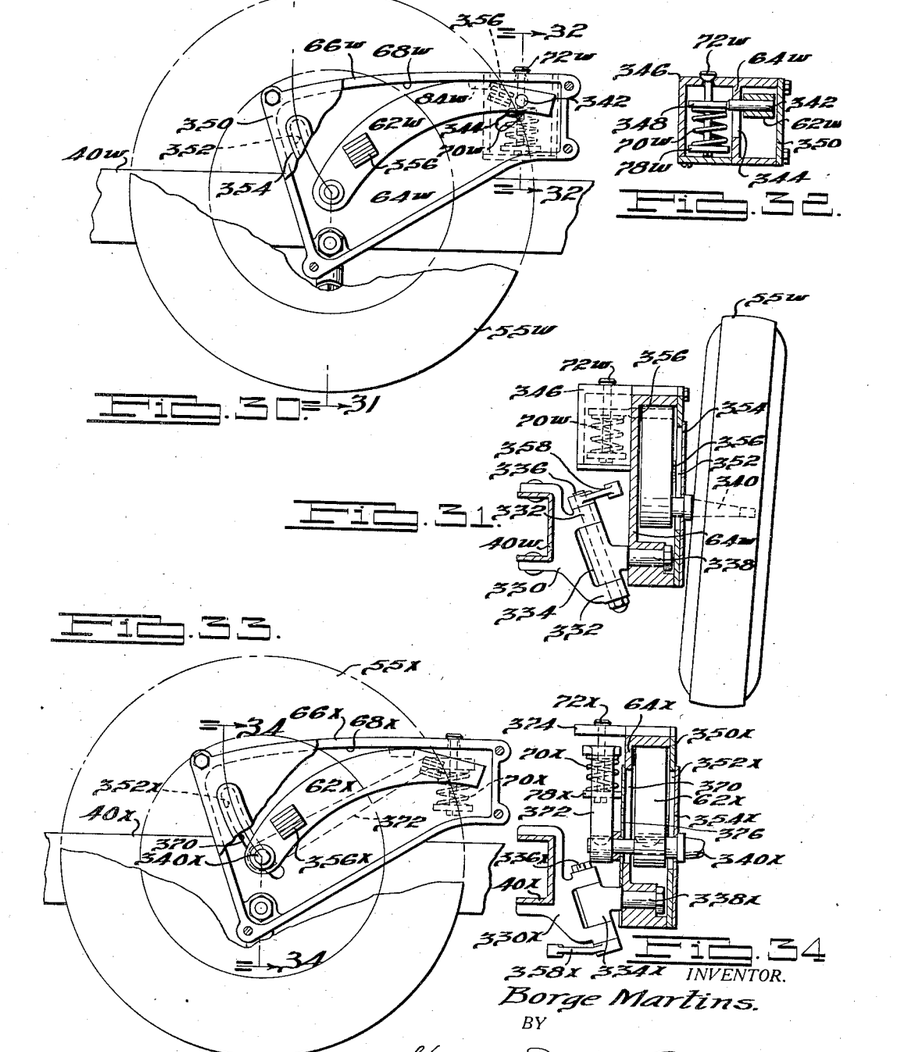
Fig. 31 is a transverse, vertical sectional view taken on the line 31—31 of Fig. 30.
Fig. 32 is a transverse, vertical sectional view taken on the line 32—32 of Fig. 30.
Fig. 33 is a view similar to Fig. 30 but illustrating a still further modification of the present invention.
Fig. 34 is a transverse, vertical sectional view taken on the line 34—34 of Fig. 33.

In Figs. 30, 31 and 32 a modified form of construction for a steering road wheel of a motor vehicle is shown. This construction is somewhat similar to the construction shown in Figs. 22 and 23 in that the rocking members turn with the wheel in its steering movement, but is different therefrom in that no guide such as the guide 224 in Figs. 22 and 23 is employed. As illustrated in Fig. 31 the frame side member 40w is provided with a bracket 330 having a pair of spaced arms 332 between which is rotatably received a knuckle member 334 pivotally mounted with respect thereto by means of a kingpin 336, the latter turning in the arms 332 and being fixed in the knuckle 334. The knuckle 334 is provided with a spindle 338, similar to a conventional wheel spindle, but in this case the plate member 64w is pivotally mounted thereon for movement in a substantially vertical plane. One end of the rocker 62w is provided with a wheel spindle fixed thereto upon which the wheel 55w is rotatably mounted in the conventional manner. The opposite end of the rocker 62w, instead of having a resistance spring contacting directly against it as in the previous construction, is provided with a pin member 342 projecting laterally therefrom through a slot 344 in the plate member 64w and into a housing 346 secured to the rear face of the plate member 64w. The pin member 342 within the housing 346 is yoked as at 348 and straddles the bolt 72w therein and the spring 70w surrounds the bolt 72w within the housing 346 and is maintained under compression between the yoke end 348 and the washer 78w in a manner similar to that described in the previous construction.

It will be particularly noted that instead of employing a box such as the box 42 in the construction illustrated in Figs. 1 to 4, inclusive, the plate member 64w in the present case is so constructed as to extend the flange 66w completely around its perimeter and the plate member 64w is increased in dimensions sufficiently so that the rocker 64w is confined completely within said perimetrical flange. A cover plate 350 closes the open side of the plate member 64w and thereby serves to form the plate member 64w into a box in which all of the operative parts of the mechanism are enclosed. The cover 350 is provided with a slot 352 therein permitting the desired movement of the spindle 340 during relative rocking movement between the rocker 62w and plate member 64w. One or more sliding plates 354 may cooperate between the spindle 340 and the outer face of the cover 350 about the slot 352 so as to seal the slot against the passage of dust, dirt or other foreign material therethrough into the interior of the plate member 64w.

The width of the flanges 66w about the periphery of the plate member 64w are preferably such that when the cover 350 is applied the rocker 62w is guided between the cover 350 and the opposite wall of the plate member 64w during its rocking movement relative to the plate member 64w. If desired, the side surfaces of the rocker 62w may be provided with suitable anti-friction means such for instance as the bearing rollers 356 which serve to reduce the friction between the sides of the rocker 62w and the cooperating surfaces of the plate member 64w and cover 350 during rocking movement of the rocker relative to the plate member. This same feature may, of course, be applied to the construction shown in Figs. 1 to 4, inclusive.

It may be observed that in this construction the twisting effect on the rocker 62w caused by the load on the wheel 55w is offset to a greater or lesser extent by offsetting the line on which the effective force of the spring 70w acts on the rocker 62w, as illustrated in Fig. 32. It will be understood that the kingpin 336 is provided with an arm 358 which may be connected with a suitable steering mechanism for controlling the steerable position of the wheel 55w. It will be observed that this construction provides a fully enclosed type of structure that is extremely economical to manufacture. No guiding means for the vertical movement of the wheel spindle 340 is provided, nor is it necessary in this case because the rockable members turn with the wheel during its steering movement and the load on the vehicle in being transmitted to the wheel is transmitted to it at a point below the axis of the wheel so that the force of gravity will always tend to maintain the wheel spindle 340 vertically above the spindle 338 about which the plate member 64w is swingable.

The construction shown in Figs. 33 and 34 is very similar to the construction shown in Figs. 30, 31 and 32 and like numerals are employed to indicate like parts except that the numerals bear the sub-mark x. In this case, however, instead of providing a pin such as the pin 342 in Figs. 30, 31 and 32 the spindle 340x is projected through and beyond the rear face of the rocker 62x and projects out through a slot 370 in the plate member 64x opposite to and of a nature similar to the slot 352x in the cover 350. To such projecting end of the spindle 340x outside of the plate member 64x an arm or lever 372 is fixed and projects in the same general direction as the rocker 62x therefrom. A flange 374 is extended from the plate member 64x into overlying relation with respect to the free end of the arm 372 and a coil spring 70x is maintained under compression between the washer 78x and the free end of the arm in a manner similar to the constructions previously described. A plate member 376 cooperates to seal the slot 370 in the member 64x in much the same manner as the plate member 354x closes the slot 352x in the cover 350x. As will be understood the effect of this construction is essentially the same as the construction shown in Figs. 30, 31 and 32, the main difference being that the spring 70x is placed outside of the closure for the rocker members and is exposed to dust, dirt and other foreign material which, however, is of no particular disadvantage in most cases.

From the foregoing it will be apparent that the present invention is applicable to a great variety of different uses wherever it is desired to resiliently resist relative movement between a pair of relatively movable parts, and also that the form and application of the present invention is subject to innumerable variations in form and application and, accordingly, it will be understood that formal changes may be made in the specific embodiments of the invention described without departing from the spirit or substance of the broad invention, the scope of which is commensurate with the appended claims.

What is claimed is:

1. In a resilient connection between a pair of relatively movable parts, a first member pivotally connected to one of said parts, a second member, an arm member connected to said second member at an angle thereto, said arm member being pivotally connected to the other of said parts, the pivotal axes of said first and arm members being substantially parallel and in substantially the same plane in the direction of relative movement between said parts and said first and second members extending in the same general direction away from said pivot points, said first and second members having contacting faces so constructed and arranged as to effect a rocking action between them upon relative movement of the pivot point of one towards and away from the pivot point of the other thereof, and spring means normally urging the ends of said first and second members opposite said pivot points thereof toward one another.

2. In a resilient connection between a pair of relatively movable parts, a first member pivotally connected to one of said parts, a second member, an arm member connected to said second member at an angle thereto, said arm member being pivotally connected to the other of said parts, said first and second members having contacting rockably associated faces, and spring means normally urging said first and second members towards a relatively rockable relation with respect to each other tending to cause the pivotal axes thereof to more closely approach one another, the curvature of said contacting faces and the relation of the pivotal axes of said members being such that relative movement of said axes toward or away from each other effects both rocking action between said first and second members and pivotal movement of both thereof in the same direction of rotation about their respective pivotal axes.

3. In a resilient connection between a pair of relatively movable parts normally urged towards movement in a predetermined direction with respect to each other, a first member pivotally mounted with respect to one of said parts, a second member, an arm member connected to said second member at an angle thereto, said arm member being pivotally mounted relative to the other of said parts on that side of the pivotal axis of the first mentioned member opposite to the direction in which said one of said parts is normally urged, said first and second members being rockably associated with one another, and resilient means normally acting upon said first and second members tending to rock them in a direction to cause their pivotal axes to more closely approach one another.

4. In a resilient connection between a pair of relatively movable parts adapted in operation for movement toward and away from each other, a first member pivoted to one of said parts, a second member, an arm member connected to said second member at an angle thereto, said arm member being pivoted to the other of said parts on that side of the pivotal axis of the first mentioned member opposite to the direction of movement in which said parts are normally urged, said first and second members being rockably associated with one another, resilient means normally acting upon said first and second members tending to rock them in a direction to cause their pivotal axes to more closely approach one another, and the cooperating faces of said first and second members being so constructed and arranged as to quickly shift the line of rockable contact between them to adjacent their unpivoted end portions when ever separation of the pivotal axes thereof is sufficient to move said line of rockable contact into the line of force of said resilient means.

5. In a resilient connection between a pair of relatively movable parts adapted in operation for movement toward and away from each other, a member pivoted to one of said parts, a second member pivoted to the other of said parts on that side of the pivotal axis of the first mentioned member opposite to the direction of movement in which said parts are normally urged, said members being rockably associated with one another, resilient means normally acting upon said members tending to rock them in a direction to cause their pivotal axes to more closely approach one another, and additional means cooperating between said members acting to snub the rockable movements thereof under the influence of said resilient means.

6. In a resilient connection between a pair of relatively movable parts, a first member pivoted to one of said parts, a second member, an arm member connected to said second member at an angle thereto, said arm member being pivoted to the other of said parts, means guiding the path of movement of the pivotal axis of said first member with respect to the pivotal axis of said arm member, said first and second members being so constructed and arranged as to rock relative to one another upon variation in the distance between their pivotal axes, and resilient means cooperating between said first and second members constantly urging said pivotal axes thereof toward one another.

7. In combination, a pair of relatively rockable members, resilient means normally urging said members toward one limit of their rockable positions, a pair of relatively movable parts normally urged toward movement in one direction, a pivotal connection between one of said rockable members and one of said parts, and an arm member connected to the other of said pair of members at an angle thereto providing a pivotal connection between the other of said members and the other said parts in substantially the same plane and being substantially parallel in the direction of relative movement between said parts, the second mentioned pivotal connection being disposed on that side of said first mentioned pivotal connection opposite to the direction in which said relatively movable parts are normally urged.

8. In a resilient connection between a pair of relatively movable parts normally urged toward movement in a predetermined direction with respect to each other, a first member having an approximately straight bearing face, an arm member connected to said first member at an angle thereto, said arm member being pivoted to one of said parts, a second member pivoted to the other of said parts on that side of the pivotal axis of the first mentioned member opposite to the direction in which said one of said parts is normally urged, said second member having a curved bearing face rockably associated with said bearing face for the first mentioned member, and resilient means normally acting upon said members tending to rock them in a direction to cause their pivotal axes to more closely approach one another.

9. In a resilient connection between a pair of relatively movable parts normally urged toward movement in a predetermined direction with respect to each other, a guide fixed against axial movement with respect to one of said parts and positioned with its axis extending approximately in the direction of relative movement between said parts, a collar non-rotatably but slidably mounted on said guide, means pivotally associated with said collar connecting said collar with the other of said parts, a member pivotally secured to the first mentioned part, a second member pivotally mounted upon said collar in rockable association with the first mentioned member, and spring means constantly urging said members toward one limit of their relative rockable positions.

10. In a resilient connection between a pair of relatively movable parts normally urged toward movement in a predetermined direction with respect to each other, a guide rotatably but axially immovably mounted upon one of said parts with its axis approximately aligned with the direction of relative movement between said parts, a collar non-rotatably but slidably mounted on said guide, means connecting said guide with the other of said parts, a member pivotally connected to said collar, a second member pivotally connected to the first mentioned part, said members being rockably associated relative to one another, means constantly urging said members toward one limit of their relative rockable positions, and means for controlling the pivotal position of said guide.

11. In a resilient connection between a pair of relatively movable parts normally urged toward movement in a predetermined direction with respect to each other, a first member pivoted to one of said parts, a second member, an arm member connected to said second member at an angle thereto, said arm member being pivoted to the other of said parts on that side of the pivotal axis of the first mentioned member opposite to the direction in which said one of said parts is normally urged relative to the other thereof, said first and second members extending in the same general direction from their respective pivotal axes with respect to a line connecting said axes, the axis of the first mentioned pivoted member being disposed on that side of a line extending through the pivotal axis of the second mentioned member in the direction of said relative movement between said parts opposite to that in which said first and second members extend, said first and second members being rockably associated with one another, and resilient means normally urging said first and second members toward one limit of their rockable positions.

12. In a resilient connection between a pair of relatively movable parts normally urged toward movement in a predetermined direction with respect to each other, a first member pivoted to one of said parts, a second member, an arm member connected to said second member at an angle thereto, said arm member being pivoted to the other of said parts and said second member lying in engagement with the first mentioned member, said first and second members being rockably associated with one another, the face of one of said members adapted to contact with the other thereof comprising a plurality of angularly related faces as viewed in a transverse section thereof, and the contacting face of said other of said members being shaped in section complementary thereto.

13. In a resilient connection between a pair of relatively movable parts normally urged toward movement in a predetermined direction with respect to each other, a guide rotatable but fixed against axial movement with respect to one of said parts and positioned with its axis extending approximately in the direction of relative movement between said parts, a collar non-rotatably but slidably mounted on said guide, means connecting said collar with the other of said parts, a member pivotally connected to the first mentioned part, a second member rockably associated with the first mentioned member and pivotally connected with respect to said collar for movement about the axis of said guide and also in the plane of movement of the first mentioned member, and spring means co-acting between said members constantly urging them toward one limit of their rockable positions.

14. In a motor vehicle, in combination, a wheel, a frame, a first member, an arm member connected to said first member, said arm member being pivotally connected relative to said frame for movement about an approximately horizontal axis, a second member pivotally connected relative to said wheel for movement in a plane parallel to the plane of movement of the first mentioned member, said first and second members being rockably associated relative to one another, and spring means cooperating between said first and second members constantly tending to urge said pivotal axes toward one another in opposition to the proportional load on said vehicle acting between said frame and wheel.

15. A wheel suspension for motor vehicles having a road wheel and a frame comprising, in combination, a first member, an arm member connected to said first member at an angle thereto, said arm member being pivotally connected to said frame for movement of said first member in an approximately vertical plane, a second member pivotally connected relative to said wheel for movement in the same plane as the first mentioned member, the pivotal connection for the first mentioned member being below the pivotal connection of the second mentioned member, said first and second members being rockably associated with one another, and spring means constantly urging said first and second members towards a relative rockable position in which said pivotal axes more closely approach one another.

16. A wheel suspension for motor vehicles having a road wheel and a frame comprising, in combination, a first member, an arm connected to said first member at an angle thereto, said arm member being pivotally connected to said frame for movement of said first member in an approximately vertical plane, a second member pivotally connected relative to said wheel for movement in the same plane as the first mentioned member, the pivotal connection for the first mentioned member being below the pivotal connection of the second mentioned member, said first and second members being rockably associated with one another, means co-acting between said first and second members confining relative movement between them solely to rocking movement, and spring means constantly urging said first and second members towards a relative rockable position in which said pivotal axes more closely approach one another.

17. In a motor vehicle, in combination, a wheel, a frame, a member pivotally connected relative to said frame for movement about an approximately horizontal axis, a member pivotally connected relative to said wheel for movement in a plane parallel to the plane of movement of the first mentioned member, said members being rockably associated relative to one another, spring means cooperating between said members constantly tending to urge said pivotal axes toward one another in opposition to the proportional load on said vehicle acting between said frame and wheel, and means cooperating between the second mentioned member and said frame acting to reduce relative lateral movement between said wheel and frame.

18. In combination with a pair of relatively movable parts, a support pivotally mounted upon one of said parts, a member pivoted upon said support for movement about a line transverse to the pivotal axis of said support, a second member pivoted to the other of said parts, said members being rockably associated with each other, resilient means for urging said members toward one limit of their rockable positions, and means sealing the cooperating faces of said members against the entrance of foreign material thereto.

19. In combination with a pair of relatively movable parts, a member pivoted to one of said parts, a second member pivoted to the other of said parts, said members being rockably associated with one another, spring means cooperating between said members tending to urge them toward one limit of their rockable position, one of said members being formed to provide a box in which the other of said members is located, and a cover for said one of said members completing the box-like closure of said other of said members.

20. In combination with a motor vehicle having a chassis frame and a road wheel, a kingpin supported by said frame, a knuckle mounted to pivot about the axis of said kingpin, a spindle projecting laterally from said knuckle, a member pivoted about said spindle for movement in an approximately vertical plane, a second member rockably associated with the first mentioned member, a wheel spindle carried by said second member, a wheel rotatably mounted on said wheel spindle, and resilient means cooperating between said members constantly urging said members toward that limit of their rockable movement in which said spindles more closely approach one another.

21. In combination with a motor vehicle having a chassis frame and a road wheel, a kingpin supported by said frame, a knuckle mounted to pivot about the axis of said kingpin, a spindle projecting laterally from said knuckle, a member pivoted about said spindle for movement in an approximately vertical plane, a second member rockably associated with the first mentioned member, a wheel spindle carried by said second member, a wheel rotatably mounted on said wheel spindle, resilient means cooperating between said members constantly urging said members toward that limit of their rockable movement in which said spindles more closely approach one another, the first mentioned member being peripherally provided with a laterally projecting flange enclosing said second mentioned member, and a cover cooperating with said flange to provide a box-like structure within which said second member is operable.

22. In combination with a pair of relatively movable parts, a member supported for pivotal movement with respect to one of said parts, a second member supported for pivotal movement with respect to the other of said parts and the said members being rockably associated with one another, one of said members being provided with a laterally projecting perimetrical flange, a cover cooperating with said flange to provide an enclosing box-like structure for enclosing said other of said members, said other of said members being provided with a part projecting out through said box-like enclosure, a lever fixed with respect to said projecting part exteriorly of said box-like structure, and spring means cooperating between said lever and the first mentioned member constantly urging said members toward one limit of their rockable positions.

23. In combination with a pair of relatively movable parts, a member pivoted to one of said parts, a second member pivoted to the other of said parts, said members being rockably associated with one another, yieldable means constantly urging said members toward one limit of their rockable positions, means for guiding one of said members in its rotatable movements relative to the other thereof, and anti-friction means cooperating between said one of said members and the second mentioned means.

BORGE MARTINS.